United States Patent
Lee et al.

(10) Patent No.: US 10,240,786 B2
(45) Date of Patent: Mar. 26, 2019

(54) PURE OXYGEN DIRECT COMBUSTION SYSTEM USING LIQUID METAL

(71) Applicant: KOREA INSTITUTE OF INDUSTRIAL TECHNOLOGY, Chungcheongnam-do (KR)

(72) Inventors: Uen Do Lee, Daejeon (KR); Won Yang, Gyeonggi-do (KR); Ji Hong Moon, Gwangju (KR)

(73) Assignee: KOREA INSTITUTE OF INDUSTRIAL TECHNOLOGY, Chungcheongnam-do (KR)

( * ) Notice: Subject to any disclaimer, the term of this patent is extended or adjusted under 35 U.S.C. 154(b) by 386 days.

(21) Appl. No.: 15/105,126

(22) PCT Filed: Jun. 30, 2014

(86) PCT No.: PCT/KR2014/005823
§ 371 (c)(1),
(2) Date: Jun. 16, 2016

(87) PCT Pub. No.: WO2015/093702
PCT Pub. Date: Jun. 25, 2015

(65) Prior Publication Data
US 2017/0003022 A1    Jan. 5, 2017

(30) Foreign Application Priority Data
Dec. 20, 2013  (KR) .......................... 10-2013-0160116

(51) Int. Cl.
*F23L 7/00*   (2006.01)
*F27D 3/14*   (2006.01)
(Continued)

(52) U.S. Cl.
CPC .............. *F23L 7/007* (2013.01); *F23C 99/00* (2013.01); *F23J 15/02* (2013.01); *F23L 7/005* (2013.01);
(Continued)

(58) Field of Classification Search
CPC .. F23L 7/007; F23L 7/005; F23C 99/00; F23J 15/02; F27D 3/14; F27D 7/02; F27D 17/004; Y02E 20/344
(Continued)

(56) References Cited

U.S. PATENT DOCUMENTS 2,730,488 A  *  1/1956  De Rosset .............. C10B 49/14
                                                    201/10
4,600,554 A  *  7/1986  Brachet ................... F22B 1/063
                                                    122/32
(Continued)

FOREIGN PATENT DOCUMENTS

CA       2680688 A1  *  4/2009  .............. B01J 8/006
CA       2680688 C   *  1/2013  .............. B01J 8/006
(Continued)

*Primary Examiner* — Stephen M Gravini
(74) *Attorney, Agent, or Firm* — McNees Wallace & Nurick LLC

(57) ABSTRACT

A pure oxygen direct combustion system using a liquid metal according to the present invention comprises: a reactor for receiving a liquid metal; a heat exchanger, connected to the bottom of the reactor, for exchanging heat for the liquid metal; a circulation pump, connected to the heat exchanger, for circulating the incoming liquid metal; a nozzle, connected to the circulation pump and disposed on the reactor; a reduction unit, connected to the circulation pump, for performing a reduction for the oxidized liquid metal; and a separation unit, connected to the reactor and the reduction unit, wherein the particles of the liquid metal injected from the nozzle are subjected to sensible heat from the gas
(Continued)

generated from the reactor, heat-exchanged by the heat exchanger and regenerated by the reduction unit, and then supplied back to the reactor.

9 Claims, 2 Drawing Sheets

(51) Int. Cl.
    *F27D 7/02*     (2006.01)
    *F23C 99/00*     (2006.01)
    *F23J 15/02*     (2006.01)
    *F27D 17/00*     (2006.01)

(52) U.S. Cl.
    CPC ............. *F27D 3/14* (2013.01); *F27D 7/02* (2013.01); *F27D 17/004* (2013.01); *Y02E 20/344* (2013.01)

(58) Field of Classification Search
    USPC .............................................. 110/215; 34/90
    See application file for complete search history.

(56) References Cited

U.S. PATENT DOCUMENTS

| | | | |
|---|---|---|---|
| 4,608,224 A * | 8/1986 | Brachet | G21C 1/03 |
| | | | 165/104.28 |
| 6,218,484 B1 * | 4/2001 | Brown | B01J 8/1836 |
| | | | 422/132 |
| 6,418,865 B2 | 7/2002 | Marin et al. | |
| 8,506,895 B2 * | 8/2013 | Wang | B01J 8/006 |
| | | | 422/211 |
| 2005/0103159 A1 | 5/2005 | Ducrocq | |
| 2009/0260585 A1 | 10/2009 | Hack et al. | |
| 2010/0216896 A1 * | 8/2010 | Wang | B01J 8/006 |
| | | | 518/700 |
| 2014/0348287 A1 * | 11/2014 | Huke | G21C 1/02 |
| | | | 376/361 |
| 2014/0356256 A1 * | 12/2014 | Lee | C10G 1/10 |
| | | | 422/643 |
| 2015/0151274 A1 * | 6/2015 | Lee | C10B 53/00 |
| | | | 422/187 |
| 2017/0003022 A1 * | 1/2017 | Lee | F27D 3/14 |

FOREIGN PATENT DOCUMENTS

| | | | | |
|---|---|---|---|---|
| KR | 10 2011 0010731 A | 10/2009 | | |
| KR | 10 2011 0052089 A | 5/2011 | | |
| KR | 10 2011 0086372 A | 7/2011 | | |
| KR | 10 2012 003458 A | 4/2012 | | |
| KR | 101156195 B1 * | 6/2012 | ............. | C10B 53/00 |
| KR | 101165403 B1 | 7/2012 | | |
| KR | 10 2013 0073020 A | 7/2013 | | |
| KR | 20150072686 A * | 6/2015 | ............... | F27D 3/14 |
| WO | WO 2009043201 A1 * | 4/2009 | ............... | B01J 8/006 |
| WO | WO 2013094879 A1 * | 6/2013 | ............... | C10B 53/00 |
| WO | WO 2015093702 A1 * | 6/2015 | ............... | F27D 3/14 |

\* cited by examiner

PURE OXYGEN DIRECT COMBUSTION SYSTEM USING LIQUID METAL

TECHNICAL FIELD

The present invention relates to a pure oxygen direct combustion system using a liquid metal, and more particularly to a pure oxygen direct combustion system using a liquid metal that supplies only oxygen to a solid fuel such as coal to burn the solid fuel, and reduces the load of a heat exchanger which is a disadvantage of a conventional system and maximizes thermal efficiency by using a flow process of the liquid metal that uses a heat source of high temperature generated when the pure oxygen is burned as a layer material and a heat transfer medium.

BACKGROUND OF THE DISCLOSURE

In general, it is known that about 54% of carbon dioxide generated in the industry is discharged in thermal power plants. Because carbon dioxide is a gas that is generally generated in the process of burning fuels, the amount of discharged carbon dioxide should be reduced at a fuel combustion time point.

The existing thermal power plants use an air combustion method in which air is used as an oxidizer and burns fossil fuels such as coal, petroleum, and natural gases are burned to produce electric power. The air combustion method uses only oxygen that occupies about 21% of air as a pure oxidizer, and nitrogen that occupies about 79% of air is unnecessarily heated.

Meanwhile, because a considerable amount of calories generated when air is burned is used to heat nitrogen, heat loss is caused, and because the concentration of carbon dioxide in the flue gas is as low as 20% or less, considerable costs are consumed to concentrate dioxide of low concentration in the flue gas to a high concentration.

Accordingly, in recent years, a pure oxygen combustion method for burning fuels by using only oxygen instead of air as an oxidizer has been developed. Unlike the existing air combustion method, the pure oxygen combustion method reduces the heat loss of the burned gases by about 75% to 80% as it rarely burns nitrogen components, and the main component of the flue gas consists of carbon dioxide ($CO_2$) and moisture ($H_2O$).

If oxygen is used as an oxidizer, it is difficult to adjust flames because a rapid exothermic reaction is caused when the oxidizer makes contact with a fuel as compared with the case in which air is used as an oxidizer. That is, in general, while the pure oxygen direction combustion has a good thermal efficiency and discharges a small amount of atmospheric contaminants, it produces combustion gases of high temperature of 3000 degrees or higher so that it is difficult to apply the method to a heat exchanger.

In order to solve the above-mentioned problems, Korean Patent Application Publication Nos. 10-2012-0033458 and 10-2011-0010731 relate to a measure for producing electric power by using a pure oxygen combustion boiler system, and disclose inventions related to an improved measurement for improving a thermal efficiency and an energy reducing effect through a process of exchanging heat between flue gases of high temperature, high temperature steam, and condensation heat generated in a power generation process through pure oxygen combustion and a part of the interior of a power oxygen combustion generation apparatus that is to be heated, or minimizing loss of electric power produced by a dual ignition boiler.

However, the cited documents disclose only that parts of waste steam or flue gases discharged from a combustion unit are heat exchanged and supply water is preheated and vapor is reheated for heat exchange through recirculation of combustion gases, and fail to disclose a pure oxygen direct combustion apparatus that does not accompany recirculation of combustion gases.

In order to solve the above-mentioned problems, the present invention provides a pure oxygen direct combustion system using a liquid metal in which sensible heat of high temperature generated in a pure oxygen combustion reaction process of a solid fuel is provided to a metal in the reactor to be used in a metal liquefying process and is circulated and supplied and heat is exchanged in a process of circulating a liquid metal of high temperature so that an overload of the reactor can be reduced in the process of supplying the liquid metal of a middle/low temperature into the reactor again.

SUMMARY OF THE INVENTION

In accordance with an aspect of the present invention, there is provided a pure oxygen direct combustion system using a liquid metal, the pure oxygen direct combustion system including: a reactor 10 in which a liquid metal 11 is fullfilled; a heat exchanger 20 connected to a lower portion of the reactor 10 such that heat is exchanged between the liquid metal 11 and the heat exchanger 20; a circulation pump 25 connected to the heat exchanger 20 to circulate the introduced liquid metal 11; and a nozzle 32 connected to the circulation pump 20 and situated on the reactor 10, wherein particles of the liquid metal 11 injected from the nozzle 32 is resupplied to the reactor 10 after receiving sensible heat from a gas generated in the reactor 10 and passing through the heat exchanger 20.

Preferably, the pure oxygen direct combustion system further include: a reduction unit 40 connected to the circulation pump 25 to perform a reduction operation on the oxidized liquid metal 11; and a separation unit 50 connected to the reactor 10 and the reduction unit 40, and the particles of the liquid metal 11 injected from the nozzle 32 is resupplied to the reactor 10 after receiving sensible heat from a gas generated in the reactor 10 and being reproduced through the reduction unit 40.

Preferably, the pure oxygen direct combustion system further includes a water flow pipe 18 disposed in the reactor 10, and heat is transferred from any one of the particles of the liquid metal 11 and the gas generated by the reactor 10 to water in the water flow pipe 18 such that the water in the water flow pipe 18 is evaporated.

Preferably, a part of the oxidized liquid metal separated from the separation unit 50 is introduced into the reduction unit 40 through an oxidized metal discharge pipe passage 52, or is resupplied to the reactor 10 through an oxidized metal supply pipe passage 54.

Preferably, the pure oxygen direct combustion system further includes a slag discharge hole 17 coupled to the reactor 10, and slag melted by the liquid metal 11 in the reactor 10 is discharged to the outside of the reactor 10 through the slag discharge hole 17.

Preferably, the liquid metal is any one of a group consisting of Sn, Bi, a mixture of Sn and Bi, and a metal that satisfies an operation condition.

Preferably, the gas generated by the reactor is an exhaust gas containing a sulfur composite.

Preferably, the pure oxygen direct combustion system further includes a buffer tank 30 disposed at an upper portion of the reactor 10 to receive the liquid metal 11 from the circulation pump 25, and the nozzle 32 is detachably mounted to the buffer tank 30 so that the nozzle is selectively coupled to the buffer tank 30 according to the size of the injection hole of the nozzle 32.

In accordance with another aspect of the present invention, there is provided a pure oxygen direct combustion system using a liquid metal, the pure oxygen direct combustion system including: a reactor 10 in which a liquid metal 11 is fullfilled; a first heat exchanger 20 connected to a lower portion of the reactor 10' such that heat is exchanged between the liquid metal 11 and the heat exchanger 20; a circulation pump 25 connected to the first heat exchanger 20 to circulate the introduced liquid metal 11; and a buffer tank 30 connected to the circulation pump 20 and situated on an upper surface of the reactor 10', wherein particles of the liquid metal 11 injected from the buffer tank 30 is resupplied to the reactor 10' after receiving sensible heat from a gas generated in the reactor 10 and passing through the first heat exchanger 20.

Preferably, the pure oxygen direct combustion system further includes: a reduction unit 40 connected to the circulation pump 25 to perform a reduction operation on the oxidized liquid metal 11; and a separation unit 50 connected to the reactor 10' and the reduction unit 40, and particles of the liquid metal 11 injected from the buffer tank 30 is resupplied to the reactor 10' after receiving sensible heat from a gas generated in the reactor 10' and being reproduced through the reduction unit 40.

Preferably, a water flow pipe 18' disposed in the reactor 10' makes contact with the liquid metal 11.

As described above, in the pure oxygen direct combustion system using a liquid metal according to the present invention, because sensible heat of high temperature generated in a pure oxygen combustion reaction process of a solid fuel is provided to a metal in the reactor to be used in a metal liquefying process and is circulated and supplied and heat is exchanged in a process of circulating a liquid metal of high temperature, an overload of the reactor can be reduced in the process of supplying the liquid metal of a middle/low temperature into the reactor again.

According to the present invention, an effect of reducing a load of a purification facility disposed at a rear side of the system through a process of separating impurities and unburned powder contained in the gases from the gases by injecting the liquid metal to the gases using nozzles.

According to the present invention, an effect of eliminating impurities contained in gases by injecting the liquid metal to the gases using nozzles.

Further, because the liquid metal used in the present invention is melted at an operation range to maintain a liquid state and has a high boiling point, loss due to evaporation thereof can be prevented.

Further, because the liquid metal used in the present invention has a high thermal capacity as compared with air and water mainly used for the existing heat exchange, the heat transfer efficiency is high so that heat can be effectively exchanged and the liquid metal can be moved conveniently due to its low viscosity.

Further, the liquid metal used in the present invention makes direct contact with gases, which are to be heated, to exchange heat, and can easily control heat exchange efficiency through changing a spray condition of the liquid metal.

Further, according to the present invention, because the liquid metal that circulates heat has a specific gravity that is greatly different from various impurities (gray ashes, unburned fuels, and moisture) that may be generated when the liquid metal makes direct contact with gases.

DETAILED DESCRIPTION OF THE INVENTION

In the present invention, a "fuel" may be a concept that includes all of a solid state fuel including coal, a liquid fuel, and a gas fuel.

In the present invention, a "gas" is defined as a concept that includes a combustion gas or a synthetic gas discharged from a combustion furnace or a heat engine such as a gasification system. The "gas" is defined as a concept that includes a combustion gas including $CO_2$ and $H_2O$.

The elements constituting the pure oxygen direct combustion system 100 using a liquid metal according to the present invention may be integrally used or separately used according to occasions. Further, some elements may be omitted according to the usage of the pure oxygen direct combustion system.

Figure 1:
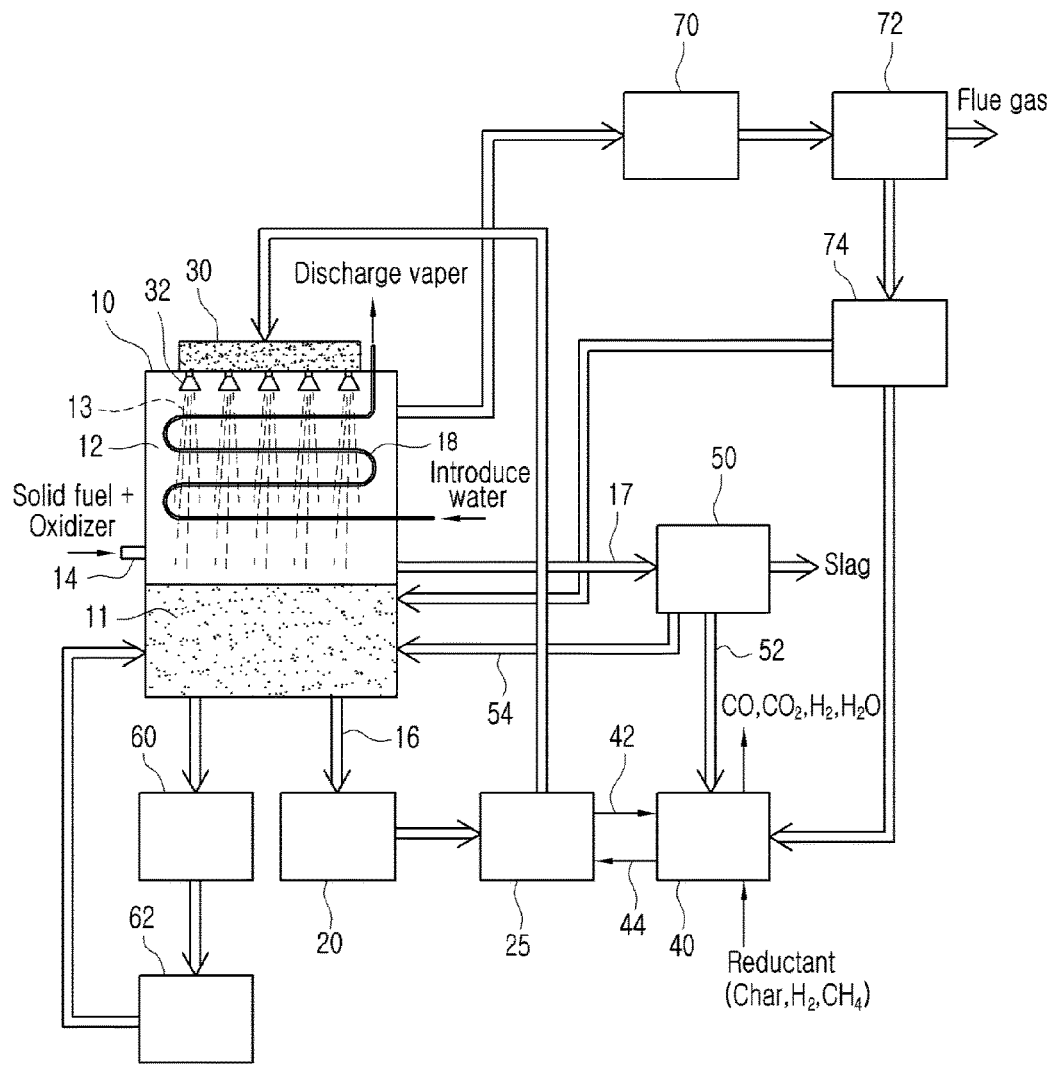
FIG. 1 is a concept view illustrating a pure oxygen direct combustion system using a liquid metal according to a first embodiment of the present invention as a whole.

Preferred embodiments of the pure oxygen direct combustion system 100 using a liquid metal according to the present invention will be described with reference to FIG. 1. It should be noted that the drawings are not to precise scale and may be exaggerated in thickness of lines or size of components for descriptive convenience and clarity. In addition, terms used herein are defined by taking functions of the present invention into account and can be changed according to user or operator custom or intention. Therefore, definition of the terms should be made according to the overall disclosure set forth herein.

Description of Pure Oxygen Direct Combustion System 100

Hereinafter, a configuration of the pure oxygen direct combustion system 100 using a liquid metal according to a first embodiment of the present invention will be described with reference to FIG. 1.

The pure oxygen direct combustion system 100 according to the present invention includes a reactor 10 to which an oxidizer and a fuel are supplied such that a combustion process is performed, a first heat exchanger 20 connected to a lower portion of the reactor 10 such that heat is exchanged between a liquid metal 11 and the first heat exchanger 20, a circulation pump 25 connected to a rear end of the heat exchanger 20 to circulate the liquid metal 11, a buffer tank 30 connected to the circulation pump 20 and situated on the upper surface of the reactor 10, a plurality of nozzles 32 coupled to the lower surface of the buffer tank 30 and having a plurality of injection holes through which the liquid metal 11 of the buffer tank 30 is injected into the reactor 10, a reduction unit 40 connected to the circulation pump 25 such that the oxidized liquid metal is reduced, and a separation unit 50 connected to the reactor 10 and the reduction unit 40.

The reactor 10 is a site where the liquid metal 11 in a melted state and the combustion gas 12, which is to be purified, and the liquid metal 11 is maintained in a melted state by using a supplied oxidizer and sensible heat generated in the combustion process of the fuel and the gas 12 generated when the liquid metal 11 is injected through the nozzle 32 is purified.

The liquid metal 11 and the gas 12 in the reactor 10 are vertically separated due to the difference between the specific gravities thereof In detail, the liquid metal 11 is situated at a lower portion of the interior of the reactor 10, and the gas 12 is situated above the liquid metal 11.

Nozzles 32 are situated at an upper portion of the reactor 10. The liquid metal 11 is injected in the form of liquid metal particles 13 between combustion gases by the nozzles 32. The liquid metal particles 13 injected into the gas 12 melt foreign substances such as H2S contained in the gas 12 into the liquid metal particles 13. The injected liquid metal particles 13 and the foreign substances drop to a lower portion of the reactor 10 while being coupled to each other, and are collected together with the liquid metal 11 situated at a lower portion of the reactor 10.

The liquid metal 11, to which the sensible heat is transferred in the combustion process of the reactor 10, is fed to the first heat exchanger 20, and the first heat exchanger 20 recycles waste heat from the liquid metal 11 of high temperature through a separate heat exchange medium.

The liquid metal 11, the temperature of which is lowered to a middle/low temperature of 500 degrees or less in the first heat exchanger, is circulated to the reactor 10 by using the circulation pump 25.

The buffer tank 30 injects the moved liquid metal 11 between the gases 12 situated at an upper portion of the reactor 10 through the nozzles 32 in the form of liquid metal particles 13 while being connected to the circulation pump 25.

A plurality of nozzles 32 may be disposed in a row at a lower end of the buffer tank 30, and the injection holes formed in the nozzles 32 may be radially formed such that the liquid metal 11 may be finely injected between the gases 12 situated at an upper portion of the reactor 10.

It may be preferable that the liquid metal circulated in this way is introduced from an upper end of the reactor 10. In this way, an insulation effect may be achieved by introducing the liquid metal into the reactor 10 through the nozzles 32 or introducing the liquid metal along a wall surface in the interior of the reactor 10.

The above-mentioned nozzle injection method may achieve a combustion gas purifying effect as the liquid metal is atomized to be lowered, and contacts with a combustion gas that is generated by a pure oxygen combustion reaction to flow to a downstream side. Further, overheating of a water cooling pipe, which is a conventional disadvantage, can be prevented and slagging of the wall surface of the water cooling pipe can be prevented by injecting the liquid metal onto a water flow pipe 18 in the interior of the reactor 10.

Meanwhile, CO2 and H2O, which are combustion gases generated by the reactor 10, are fed to a separate heat exchanger disposed outside the reactor 10 such that heat is exchanged, and CO2 is stored in a separate storage through the carbon capture & storage (CCS) technology and the condensate is discharged.

Meanwhile, the combustion gas 12 in the interior of the reactor 10 is moved to a dust collector 72 after being discharged from the reactor 10 together with oxidants of the liquid metal 11 and passing through the second heat exchanger 70. Thereafter, the oxidants is collected by the dust collector 72, and the gas is discharged to a post process. The oxidants collected by the dust collector 72 are directly introduced into the reactor 10 through an oxidant storage vessel 74, or is introduced into the reduction unit 40.

The liquid metal 11 in the reactor 10 may be discharged to a discharge vessel 60 according to situations and conditions. The liquid metal 11 discharged to the discharge vessel 60 may be preserved in the storage vessel 62 through a milling or cutting process, and may be reintroduced into the reactor 10.

A fuel injection port 14 through which a solid fuel and an oxidizer are injected after being mixed, and a water flow pipe 18 through which water is introduced to be evaporated by heat from the liquid metal of high temperature are disposed in the reactor 10. The combustion gas 12 generated in the interior of the reactor 10 may be purified through the reactor 10, and may be discharged to the outside. That is, because the injected liquid metal is moved into the gas such that heat is exchanged, the temperature of the discharged gas is reduced. Because the temperature of the flames generated due to the combustion of the solid fuel and the oxidizer is a high temperature, it is preferable that the fuel injection port 14 is disposed between the water flow pipe 18 and the liquid metal in the reactor 10.

Meanwhile, the water introduced into the water flow pipe 18 is evaporated due to the heat transferred from the liquid metal particles 13 injected from the nozzles 32 and the combustion gas 12, and accordingly, may be used for a steam turbine or as heating water. The water flow pipe 18 can prevent overheating and slagging due to the liquid metal particles 13.

The reactor 10 may further include a slag discharge pipe passage 17 through which slags are discharged to the outside. The slags, which are impurities melted in the liquid metal particles 13 while the liquid metal particles 13 pass through the gas 12 float on the surface of the liquid metal 11 due to the difference of gravities of the liquid metal 11 while the liquid metal 11 stays at a lower portion of the reactor 10. Accordingly, the slag discharge pipe passage 17 may be situated in the vicinity of an upper end of the liquid metal 11 and may discharge the slags to the outside. Then, the discharged slags are discharged while being mixed with the oxidized metal particles.

The circulation pump 25 is connected to the first heat exchanger 20 and the buffer tank 30 such that the liquid metal 11 is circulated in the pure oxygen direct combustion system 100. The circulation pump 25 may be connected to a lower portion of the reactor 10 to circulate the liquid metal 11 that contains a small amount of slags. That is, because slags of low specific gravity floats in the reactor 10, a relatively small amount of impurities are left at a lower layer of the liquid metal 11.

The reduction unit 40 allows recycling the oxidized liquid metal introduced through an introduction pipe 42 from the circulation pump 25 by using reductant, and the reduced liquid metal flows to the circulation pump 25 again through the discharge pipe 44. Here, the reductant for the oxidized liquid metal includes char, $H_2$, and $CH_4$, and CO, $CO_2$, $H_2$, and $H_2O$ are discharged from the reduction unit 40 through a reduction reaction. The liquid metal reduction reaction and the heat exchange may be performed at the same time by using the reduction medium as the fluid of the first heat exchanger 20.

The separation unit 50 performs a process of separating slags and the liquid metal discharged through the slag discharge pipe passage 17. A centrifugal separator using a density difference may be suitable for the separation unit 50. The oxidized liquid metal separated from the separation unit 50 is introduced into the reduction unit 40 through an oxidized metal discharge pipe passage 52, or is directly resupplied to the reactor 10 through an oxidized metal supply pipe passage 54.

According to the present invention, because the liquid metal 11 that circulates heat has a high thermal capacity as compared with air and water that have been mainly used in the conventional heat exchange, its heat transfer efficiency is high so that it is suitable for an effective heat exchange when a suitable process design is accompanied, and it has a low viscosity as compared with other liquid metals so that it can be moved conveniently and is suitable for the process.

Further, according to the present invention, liquid metal 11 is effective for separation by a filter and difference of specific gravity. Because the liquid metal 11 that circulates heat has a specific gravity that is greatly different from various impurities (gray ashes, unburned fuels, and moisture) that may be generated when the liquid metal 11 makes direct contact with gases.

Further, according to the present invention, it is preferable that the liquid metal 11 that circulates heat is formed by melting any one of tin (Sn), bismuth (Bi), or a mixture of tin (Sn) and bismuth (Bi), and any metal that satisfies the operation conditions is possible. The liquid metal 11 consisting of tin (Sn), bismuth (Bi), or a mixture of tin (Sn) and bismuth (Bi) can be melted to maintain a liquid state according to an operation of a gas purifying apparatus 100 according to the present invention, and has a high boiling point so that it is not lost due to evaporation thereof during an operation of the gas purifying apparatus 100 according to the present invention.

Figure 2:
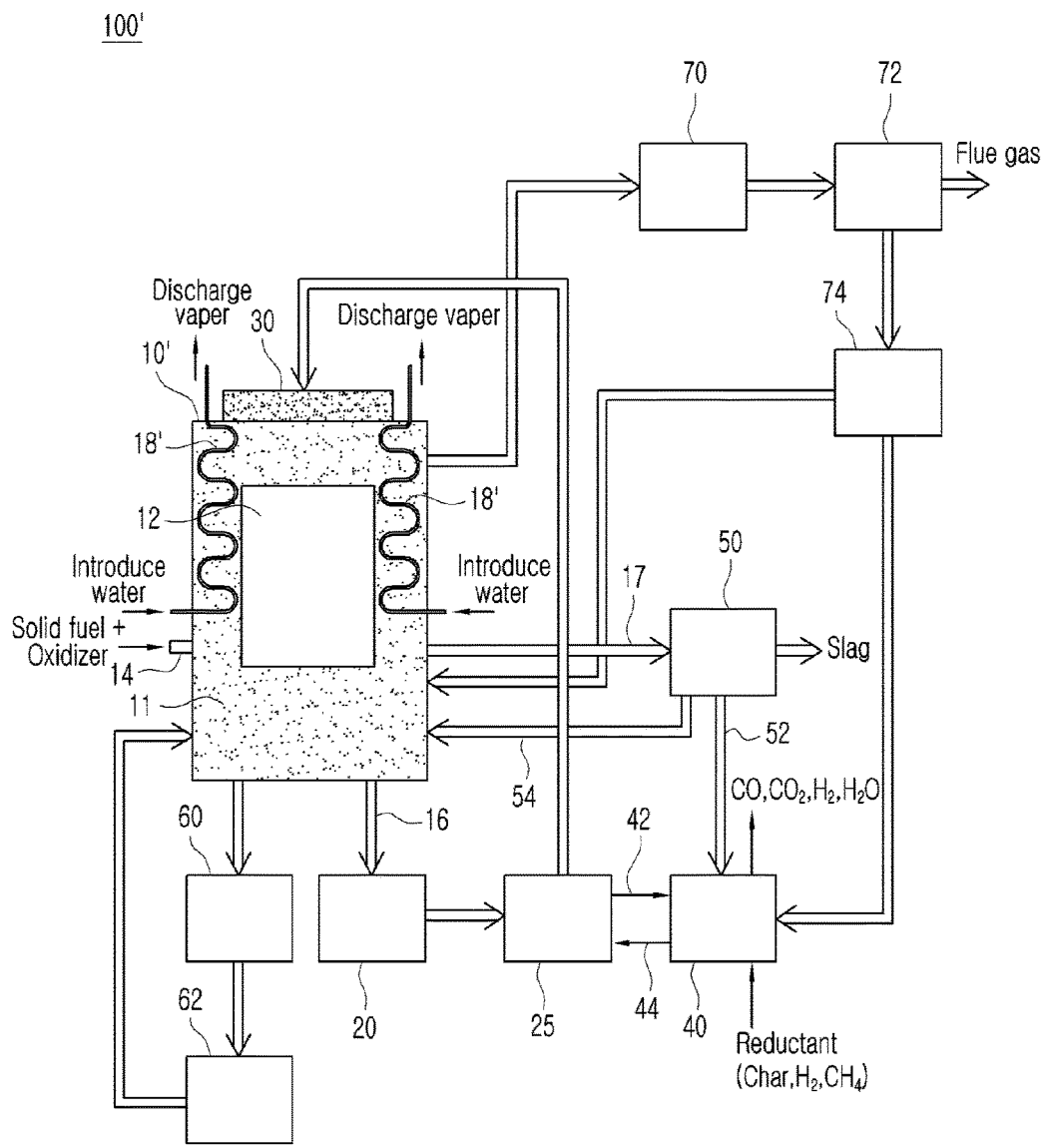
FIG. 2 is a concept view illustrating a pure oxygen direct combustion system using a liquid metal according to a second embodiment of the present invention as a whole.

Hereinafter, a configuration of the pure oxygen direct combustion system 100 using a liquid metal according to a second embodiment of the present invention will be described with reference to FIG. 2.

In the second embodiment 100', the same parts as the first embodiment 100 will be omitted and different technical parts will be mainly described.

The pure oxygen direct combustion system 100' is configured such that a liquid metal 11 surrounds a space in which a combustion gas 12 in a reactor 10' is generated. The liquid metal 11 may be supplied through an upper portion of the reactor 10' from a buffer tank 30 without using a separate nozzle while the nozzles 32 in the first embodiment 100 are removed. The water flow pipe 18' is disposed on a wall surface of the reactor 10' and makes contact with the liquid metal 11 that flows down along the wall surface. Through the above-mentioned structure, overheating and slagging of the water flow pipe 18' can be prevented. Through this, a high temperature area can be prevented from being generated in a specific area of a water flow pipe of an actual reactor.

As described above, in the pure oxygen direct combustion system using a liquid metal according to the present invention, because sensible heat of high temperature generated in a pure oxygen combustion reaction process of a solid fuel is provided to a metal in the reactor to be used in a metal liquefying process and is circulated and supplied and heat is exchanged in a process of circulating a liquid metal of high temperature, an overload of the reactor can be reduced in the process of supplying the liquid metal of a middle/low temperature into the reactor again.

That is, according to the present invention, because a heat source of high temperature, which is generated when a solid fuel such as coals is burned into pure oxygen by the pure oxygen direct combustion system, is processed by using the metal liquefying and heat exchange characteristics, the load of the heat exchanger, which has been a problem of an existing system, can be reduced and thermal efficiency can be maximized. Through this, because combustion gas of a high temperature of 3000 degrees or higher can be generated in the conventional pure oxygen direct combustion process, a disadvantage of hardly applying the combustion gas to a heat exchanger can be overcome, thermal efficiency can be increased, and the amount of discharged atmospheric contaminants can be reduced.

Although the preferred embodiments of the present invention have been described, it will be understood by those skilled in the art that the present invention can be variously corrected and modified without departing from the spirit and scope of the present invention claimed in the claims.

The invention claimed is:

1. A pure oxygen direct combustion system using a liquid metal, the pure oxygen direct combustion system comprising:
    a reactor in which a liquid metal is fulfilled;
    a heat exchanger connected to a lower portion of the reactor such that heat is exchanged between the liquid metal and the heat exchanger;
    a circulation pump connected to the heat exchanger to circulate the liquid metal; and
    a nozzle connected to the circulation pump and situated on the reactor,
    a reduction unit connected to the circulation pump to perform a reduction operation on an oxidized liquid metal; and
    a separation unit connected to the reactor and the reduction unit,
    wherein the particles of the liquid metal injected from the nozzle is resupplied to the reactor after receiving sensible heat from a gas generated in the reactor and being reproduced through the reduction unit; and
    wherein particles of the liquid metal injected from the nozzle are resupplied to the reactor after receiving sensible heat from a gas generated in the reactor and passing through the heat exchanger.

2. The pure oxygen direct combustion system of claim 1, further comprising a water flow pipe disposed in the reactor,
    wherein heat is transferred from any one of the particles of the liquid metal and the gas generated by the reactor to water in the water flow pipe such that the water in the water flow pipe is evaporated.

3. The pure oxygen direct combustion system of claim 1, wherein a part of the oxidized liquid metal separated from the separation unit is introduced into the reduction unit through an oxidized metal discharge pipe passage, or is resupplied to the reactor through an oxidized metal supply pipe passage.

4. The pure oxygen direct combustion system of claim 1, further comprising a slag discharge hole coupled to the reactor,
    wherein slag melted by the liquid metal in the reactor is discharged outside of the reactor through the slag discharge hole.

5. The pure oxygen direct combustion system of claim 3, wherein the liquid metal is any one of a group consisting of Sn, Bi, and a mixture of Sn and Bi.

6. The pure oxygen direct combustion system of claim 3, wherein the gas generated by the reactor is an exhaust gas containing a sulfur composite.

7. The pure oxygen direct combustion system of claim 3, further comprising a buffer tank disposed at an upper portion of the reactor to receive the liquid metal from the circulation pump, wherein the nozzle is detachably mounted to the buffer tank so that the nozzle is selectively coupled to the buffer tank according to a size of the injection hole of the nozzle.

8. A pure oxygen direct combustion system using a liquid metal, the pure oxygen direct combustion system comprising:
- a reactor in which a liquid metal is fulfilled;
- a first heat exchanger connected to a lower portion of the reactor such that heat is exchanged between the liquid metal and the heat exchanger;
- a circulation pump connected to the first heat exchanger to circulate the liquid metal; and
- a buffer tank connected to the circulation pump and situated on an upper surface of the reactor,
- a reduction unit connected to the circulation pump to perform a reduction operation on an oxidized liquid metal; and
- a separation unit connected to the reactor and the reduction unit,
- wherein particles of the liquid metal supplied from the buffer tank is resupplied to the reactor after receiving sensible heat from a gas generated in the reactor and being reproduced through the reduction unit; and
- wherein particles of the liquid metal supplied from the buffer tank are resupplied to the reactor after receiving sensible heat from a gas generated in the reactor and passing through the first heat exchanger.

9. The pure oxygen direct combustion system of claim 8, wherein a water flow pipe disposed in the reactor makes contact with the liquid metal.

* * * * *